United States Patent
Clary et al.

[11] Patent Number: 5,212,656
[45] Date of Patent: May 18, 1993

[54] BOX INSPECTION DEVICE AND METHOD

[75] Inventors: Michael W. Clary; Theodore J. Hartka, both of Phoenix; John H. Holmes, Owings Mills, all of Md.

[73] Assignee: Prime Technology, Inc., Sparks, Md.

[21] Appl. No.: 692,018

[22] Filed: Apr. 26, 1991

[51] Int. Cl.[5] ............................................. G01N 21/89
[52] U.S. Cl. ..................... 364/552; 493/12; 364/561
[58] Field of Search ............. 364/552, 551.01, 468, 364/471, 469, 563, 561; 356/429; 382/1, 8; 358/101, 106, 107; 493/10, 12, 14, 124, 125, 179

[56] References Cited

U.S. PATENT DOCUMENTS

| | | | |
|---|---|---|---|
| 4,522,617 | 6/1985 | Mowry | 493/126 |
| 4,704,034 | 11/1987 | Takenaka et al. | 356/429 |
| 4,972,494 | 11/1990 | White et al. | 382/8 |
| 4,974,077 | 11/1990 | Kusaba | 358/107 |
| 5,007,096 | 4/1991 | Yoshida | 382/1 |
| 5,035,683 | 7/1991 | Takeda et al. | 493/179 |

Primary Examiner—Parshotam S. Lall
Assistant Examiner—Michael Zanelli
Attorney, Agent, or Firm—Jones, Day, Reavis & Pogue

[57] ABSTRACT

A quality monitoring system employing vision processing equipment to photograph at least one of the edges of every folded-over box blank as it is conveyed through a box forming machine is used to determine in-line whether the blanks, when unfolded, will produce square boxes having essentially all 90° angles between adjacent sides. The folded-over blanks have a manufacturer's gap between adjacent box side panels. The electronic images are electronically digitized and the resulting data processed by computer to calculate critical parameters of the folded-over blank, including gap width, longitudinal taper of the gap width, and alignment of the lateral edges of the panels surrounding the gap in relation to the lateral edge of the gap. Comparison of these measured critical parameters with corresponding parameters for an idealized box stored in the computer indicates the quality of the formed box and whether the quality falls within acceptable parameters. Provision is made in the system to photograph the blank upstream of or downstream of a squaring and stacking station of the folding machine, or in both positions.

25 Claims, 4 Drawing Sheets

BOX INSPECTION DEVICE AND METHOD

BACKGROUND OF THE INVENTION

The present invention relates generally to a method and apparatus for the manufacture of boxes or cartons, and more specifically to a vision inspection or monitoring system for measuring in-line the quality of each finished box or carton—especially corrugated boxes.

Boxes or cartons such as corrugated boxes are produced by the container industry on high-speed manufacturing machinery. The machines employed for this purpose are complicated assemblages of interworking parts, which automate the box manufacturing process, converting a simple cardboard blank into a box in a "folded-down" state. In a typical process, score lines are added to the blank at appropriate positions in order to define four side panels and eight end panels. A glue flap extends along one of the side panels. The scored blank is fed to an automated machine, which employs a conveyor system to move the scored blank through the machine. In this way, the blank undergoes controlled movement in a longitudinal direction while minimizing and, preferably, eliminating undesirable lateral movement. Glue is applied to the glue flap at a "glue station" within the machine, and the exterior side panels of the blank are then folded upon their adjacent interior side panels by means of cooperating deflection devices provided along the conveyor belt path so that the glue flaps meet the opposite exterior panels in order to produce a finished box in its folded-down state, as it emerges from the machine. In an embodiment of this invention, the seam between the panel and the glue flap may be pressed through press rolls.

These boxes are manufactured at speeds in excess of 300 blanks per minute. Yet, at least thirty different machine variables such as feed roll pressure, conveyor belt speed, timing of the folding device cycle, and the like contribute to a properly manufactured box. For instance, if the folding mechanism is not timed properly in sequence with the moving blank, a square fold will not be obtained. Likewise, if the blank is not securely retained by the traveling or conveyor mechanism or is engaged too strongly by the folding mechanism, it could "fishtail," thereby preventing a square fold. Therefore, if any of these variables is not precisely coordinated with the other variables, the folding machine will not produce an optimal "square" box which, when unfolded, will have all 90° angles.

The operator of the folding machine, thus, encounters significant problems in controlling the production of the boxes to achieve desired optimal results. Because the blanks travel at speeds in excess of 300 units per minute, it is impractical for the operator to visually follow the folding and gluing steps in order to control the process to produce boxes with 90° angles. Likewise, it would be commercially unfeasible for the operator to cease operation of the folding machine periodically in order to inspect a box. Statistical processing control has been suggested to overcome this problem whereby selected representative samples of completed boxes are collected and analyzed to determine the acceptability of the product being produced and the desirability of adjusting the manufacturing process variables to overcome any detected defects. However, it is clear that an in-line capability of performing quality control checks of the product being produced without interfering with the production run would be highly desirable and significantly more operationally effective for adjustment of the process variables as opposed to analysis of already produced product. Also, quality control inspection of every box produced would be a highly desirable improvement over prior random sampling systems. Therefore, provision of such capability for in-line quality control monitoring of each box in production without interfering with the production run would be highly advantageous relative to prior processes employed in this art.

Various video inspection systems are known in the prior art. U.S. Pat. No. 4,344,146 issued to Davis, Jr. et al., for example, discloses such a scheme consisting of a television camera, which produces a digital video image of the subject matter, an interface with a direct memory access channel for structuring the digital data, high-speed random access memory for storing the data, a bus oriented processor for processing the data in the memory, a digital computer for controlling operation of the system, and a terminal which presents the data to the machine operator so any flawed work pieces may be detected and fixed. Davis indicates that such a system could be used to ensure that labels are correctly placed on bottles. U.S. Pat. No. 4,758,888 issued to Lapidot teaches an automatic work station for inspection of work pieces traveling along a production line, incorporating a television camera and a computer. The machine operation may retrieve the stored images to verify the detected flaws, and remove the applicable work pieces at a downstream sorting station. However, the video inspection systems disclosed by Davis and Lapidot merely provide a visual image of the workpiece, which then must be analyzed by the operator to determine whether any product flaws fall within acceptable ranges. Such an analysis is time consuming, prone to inaccuracy and subject to the skill of the operator.

U.S. Pat. No. 4,578,052 issued to Engel et al., by contrast, provides a method and apparatus for detecting deviations of folds in a sheet of paper in which electro-optical sensors are positioned above the folding cylinder of a folding machine. These sensors electrically evaluate markings prepositioned on the sheet along the desired fold line, and a computer evaluates and processes the data. As illustrated in FIG. 4 of the reference, the system detects sheets having skewed folds, because the distance between each respective mark and a common reference point will not be the same. The operator uses the data to make necessary adjustments to the folding machine. The Engel system, though, is dependent upon prepositioning the marks along the fold lines, which requires an extra step in the manufacturing process, thereby increasing production costs.

SUMMARY OF THE INVENTION

Accordingly, it is a primary object of the present invention to provide a system for monitoring the quality of boxes or containers such as corrugated cardloard containers during the manufacturing process.

It is a further object of the present invention to provide a video inspection system for evaluating fold lines of box blanks traveling at high speeds, and automatically determining and measuring any deviations from an optimal square box configuration wherein all angles of the unfolded, open box or carton assembly will be right angles.

Another object of the present invention is to provide a system which will process in-line quality control data or information representing the folded configuration of each box or carton produced and indicative of the alignment of the resulting finished box or carton, and present it to the machine operator in a variety of formats, for example, in regard to the last box produced, the average box produced, and the boxes having maximum and minimum variation from acceptable product criteria.

A still further object is to provide an apparatus for conducting quality control inspection of each box produced in a box forming operation in-line during the production process.

These and other objects are achieved by employing vision processing equipment to electronically image or photograph at least one of the edges of every box blank as it is conveyed through a box forming machine after the blank has been appropriately scored, folded and glued to produce a box in a "folded-down" state having four interconnected, slotted panels with a gap or "manufacturer's joint" formed between two adjacent ones of these panels by a glued down "glue flap" which provides the interconnecting element between such panels.

The electronic image is digitized and processed employing known vision processing computer equipment, and the digitized data obtained from the photograph of the actually produced product is employed to measure certain critical parameters of the produced product in order to perform quality control analysis thereof. The critical parameters of the formed box include a measurement of the gap width, any longitudinal taper of the gap width, and a determination of the alignment of the lateral edges of the two panels surrounding the gap in relation to the lateral edge of the gap. By comparing the results of this measurement procedure, preferably utilizing extrapolation techniques, with criteria stored in the computer, an indication is provided of the quality of the formed box and a determination is made as to whether the quality of the formed box is within acceptable parameters.

DETAILED DESCRIPTION OF THE PREFERRED EMBODIMENT

Figure 1:
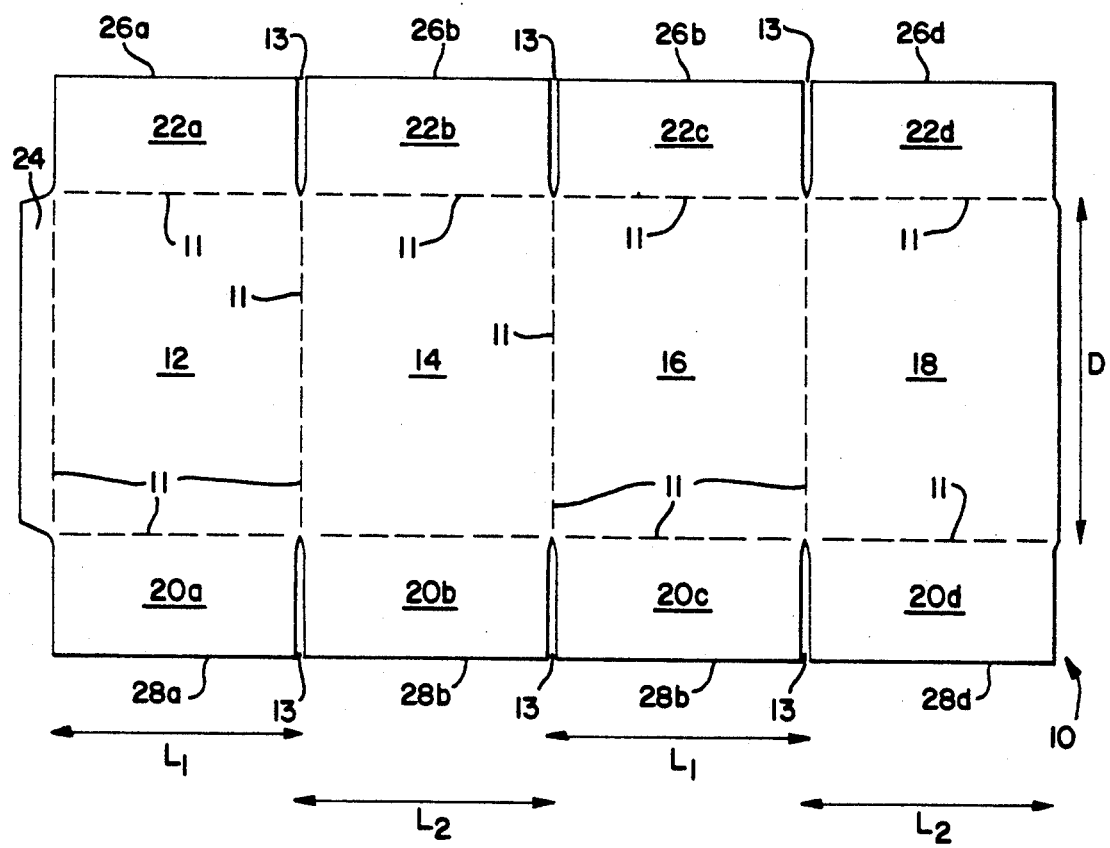
FIG. 1 is a plan view of a flat box blank.

In a standard process for producing corrugated cardboard containers known in the trade as "RSCs" (Regular Slotted Containers), the finished box or carton is made from a flat blank 10 illustrated in FIG. 1, which has score lines 11 and slots 13 formed therein at strategic positions in order to accommodate production of a box having four side panels 12, 14, 16 and 18. The score lines 11 form the perimeter to the side panels 12, 14, 16 and 18 of the box and slots 13 project outwardly generally along the extensions of the score lines 11 to form bottom panels 20a, 20b, 20c, and 20d and top panels 22a, 22b, 22c, and 22d on panels 12, 14, 16, and 18, respectively. It should be noted that panels 20a and 20c, and 22a and 22c, as well as panels 12 and 16 have the same general lateral width, whereas panels 20b, 20d, 22b, 22d, 14, and 18 likewise have the same general width relative to one another. The bottom and top panels 20 and 22 may be folded inwardly in an appropriate overlapping manner to provide a bottom and a top, respectively, for a finished box. In addition, glue flap 24 extends outwardly from the longitudinally exterior edge of side panel 12. Accordingly, by appropriate folding of the side panels 12, 14, 16 and 18, the bottom panels 20, and the top panels 22 about the score lines 11 and gluing of the glue flap 24 to interconnect exterior side panel 12 with exterior side panel 18, a box is formed having a depth D and side lengths $L_1$ (corresponding to the lateral width of panels 12, 16, 20a, 20c, 22a, and 22c) and $L_2$ (corresponding to the lateral width of panels 14, 18, 20b, 20d, 22b, and 22d).

Figure 2:
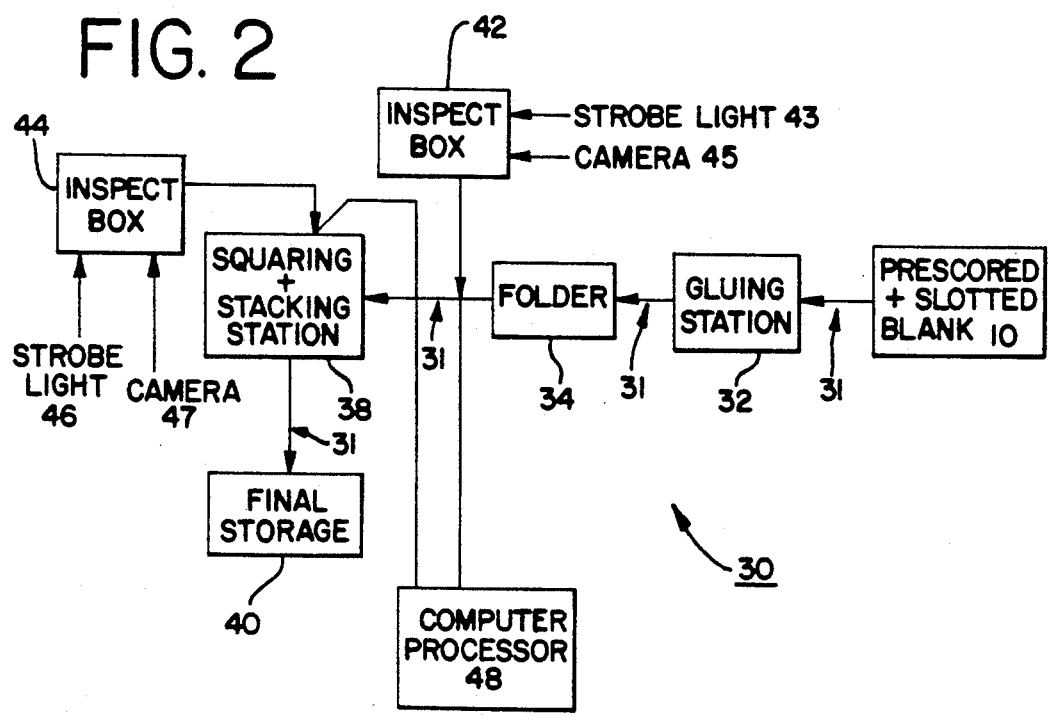
FIG. 2 is a schematic representation of a box manufacturing apparatus.

FIG. 2 shows in schematic form a box manufacturing apparatus 30, for processing a prescored blank 10 into a finished box. In this regard, a leading edge 26 of the blank is fed into the machine 30 via a traveling means such as a conveyor belt 31. The leading edges 26a and 26d of the blank 10 are formed by the laterally exterior edges of the top panels 22a and 22d, respectively, while leading edge section 26b is being formed from a combination of top panels 22b and 22c of the blank 10. Trailing edges 28a, 28b and 28d likewise are formed by the exterior edges of the bottom panels 20a, 20d, and combined panels 20b and 20c.

Figure 3:
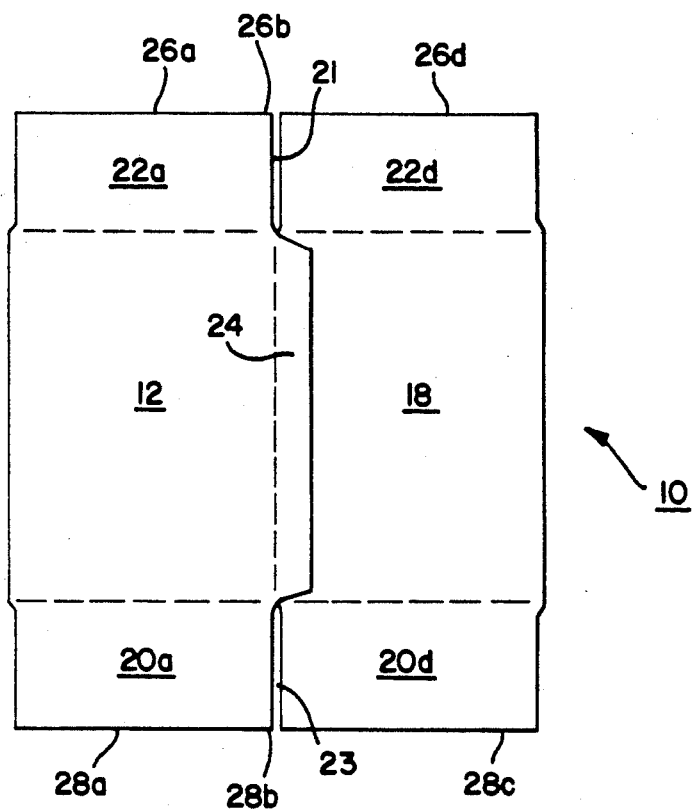
FIG. 3 is a plan view of a correctly folded box blank.

While the blank 10 is being moved on the conveyor belt, glue is placed on the glue flap 24 of blank 10 at a gluing station 32, and the panels 12, 14, 16 and 18 are folded about score lines 11 in a folder mechanism 34 of the machine 30. Any of a number of folding devices known in the art such as helical conveyor belts, helical deflection rails, or pivoting arms may be employed for purposes of the folder 34 to fold box side panel 12 onto side panel 14, and side panel 18 onto side panel 16 In so doing, glue flap 24 comes to rest either on top of or beneath side panel 18 along its exterior longitudinal edge. If desired, the seam created by the interconnection of the glue flap 24 with panel 18 may be pressed by press rolls, although such pressing is not required to produce a finished box in a folded-down position As illustrated in FIG. 3, the finished boxes are squared and stacked at station 38, and then conveyed to a final storage position 40.

Figure 4:
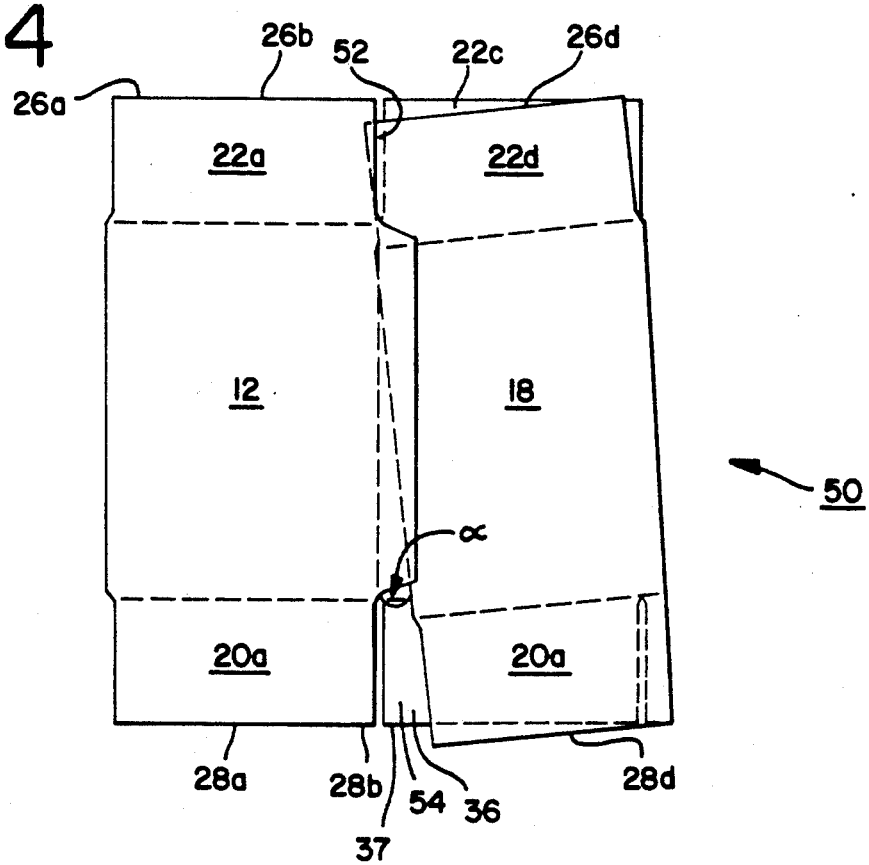
FIG. 4 is a plan view of an incorrectly folded box blank.

As previously noted, in the event that proper setting and/or synchronization is not achieved in the blank traveling and folding sections of an automated folding machine used in the container industry, the blank may fishtail or side panels 12 and 18 may not be properly folded over onto panels 14 and 16, thereby producing an undesirable folded down box blank 50 without square edges, as shown in FIG. 4, which, when opened, will not provide a box with 90° angular alignment between adjoining panels. Such a poorly folded blank 50 may exhibit manufacturer's joints 52 and 54, which are not of equal width (unlike the manufacturer's joints 21 and 23 of properly folded blank 10 depicted in FIG. 3), or, if the manufacturer's joints are equal, they may be too wide. Likewise, the lateral edges, which are at right angles to the direction of travel of the blank 10 through the machine 30, of panels 12 and 18 may not lie in proper alignment. Such an improperly folded blank 50, as shown in FIG. 4, causes severe quality control problems, especially considering the high volume in which these boxes are produced.

It is, therefore, an object of the present invention to provide monitoring means for detecting in-line whether undesirable blanks, such as blank 50, are being produced, and for enabling the operator to assess and analyze the problem in the setting and/or synchronization of the operating apparatus and to adjust the critical parameters of the production process in order to overcome these problems, and to enable production of "square" boxes The term "square" box, as used herein, means a box having a manufacturer's joint or gap, which measures a desired width between adjacent interior panels, the longitudinal edges of which are parallel with each other and do not cause the gap to vary or taper along the longitudinal axis of the box as it is fed through a box forming machine, and which exhibits an alignment of the trailing and lead edges of the exterior panels such that they are parallel to each other and are overlappingly co-extensive with the trailing and lead edges of the interior panels. The portion 36 of panels 20b, 20c, 22b, and 22c, which is visible beneath the gaps or manufacturer's joints 21 and 23 in FIG. 3 or 52 and 54 in FIG. 4 has an edge 37, hereinafter referred to as the "gap lateral edge."

In accordance with the present invention, therefore, a visual inspection system is positioned in at least one of the stations 42 and 44, preferably, at both 42 and 44 in order to enable evaluation of the condition of the folded panel prior to squaring and stacking, and after squaring and stacking of the finished box. Such visual inspection system provides a method of monitoring the quality of the boxes, using visual processing technology. In conjunction with a known light source, such as strobe light 43, a known, commercially available, high-definition video device 45 (such as that sold by Allen-Bradley Company under the tradename "CVIM System") takes an electronic image of the trailing edge 28 and/or lead edge 26 of every blank 10 as it exits folder 34 and approaches squaring and stacking station 38. It should be noted that other visible inspection devices may be utilized to achieve an electronic image. As illustrated, the photographic image, in turn, is transmitted to computer 48, where it is electronically digitized and processed.

Figure 5:
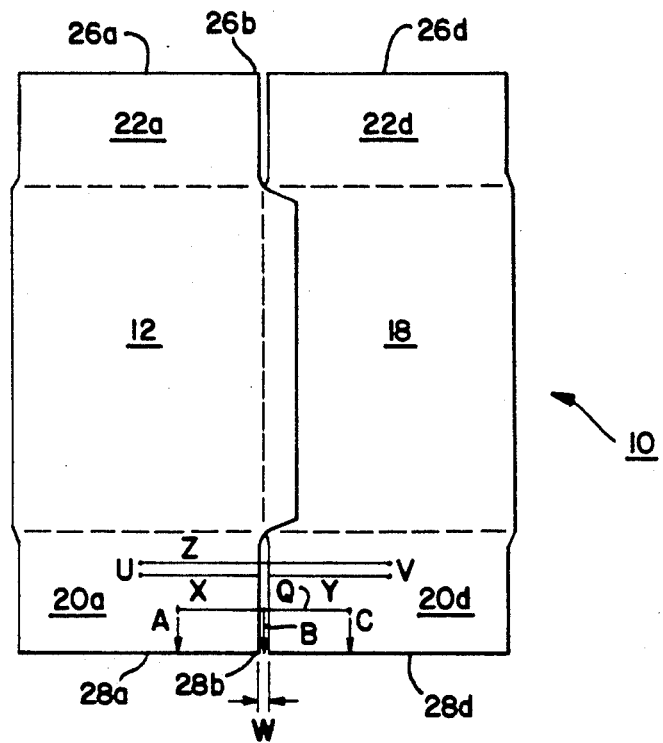
FIG. 5 is a plan of a folded box blank overlayed with the computer-assisted processing reference points of the present invention.

FIG. 5 illustrates a computer-assisted processing method for analyzing and evaluating a folded-over blank 10, where it is understood that the various reference points and arrows depicted are not part of the blank, itself. Using the electronically digitized image of blank 10 produced by the video camera 45, a commercially available computer (such as that sold by Allen-Bradley Company in their "CVIM System" determines the gap width W between the facing longitudinal edges of panels 12 and 18 which are interconnected via glue flap 24. For example the gap width W may be measured by determining the distance Z between video reference points U and V, and the distances X and Y between points U and V and the exterior longitudinal edges of their respective side panels 12 and 18. Subtracting distances X and Y from distance Z yields gap width W. The resulting gap width W is then compared with a critical value stored in the computer for an idealized square box.

Figure 7:
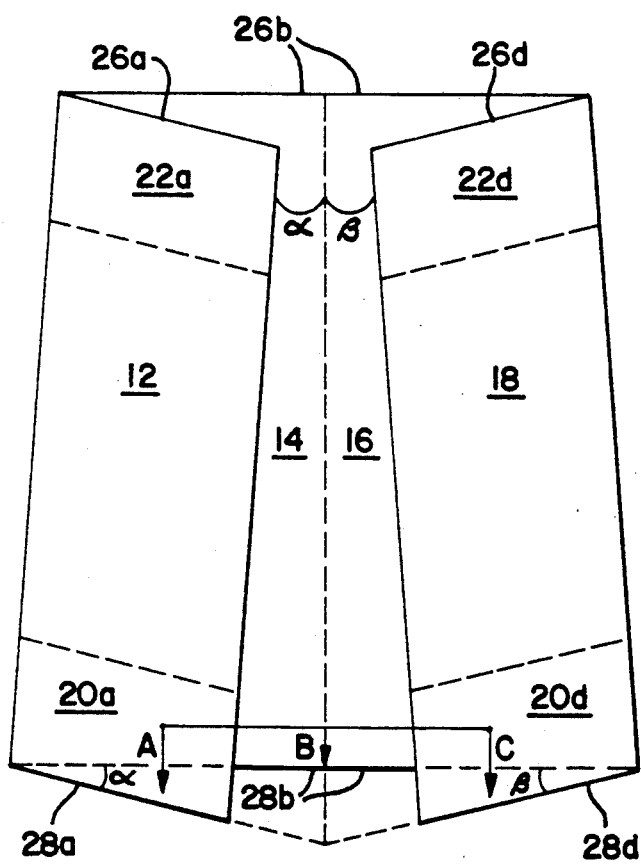
FIG. 7 is a plan view of an incorrectly folded box blank.

As a further critical element in assuring the quality of the box being formed in the process, the computer also evaluates the folded-over blank for alignment, as, for example, by determining distances A, B, and C between a reference line Q visually superimposed on the blank by the computer, and trailing edges 28a, 28b, and 28d of blank 10. The folded-over blank will have square folds if the differential distance between distance A and distance B is substantially equivalent to the differential distance between distance C and distance B. However, in the event that a taper angle $\alpha$ of the longitudinal edge of panel 12 relative to the longitudinal axis of the gap exists, then the folded-over blank will not have square folds. Taper angle $\alpha$ may be calculated as generally the arctangent of the ratio of the differential distance between distance A and distance B, as defined above, to the width of the lateral edge of panel 12. Likewise, a taper angle $\beta$ may be calculated for panel 18, as generally the arctangent of the ratio of the differential distance between distance C and distance B to the width of the lateral edge of panel 18. For further reference, taper angles $\alpha$ and $\beta$ may be combined to provide a general indication of the overall longitudinal taper of the edges surrounding the gap (See FIGS. 4 and 7).

After the computer makes the required analysis, the comparative data is stored in a computer database. The machine operator may reference or recall this data at any time in order to determine whether boxes with squarely folded edges are being produced by the ongoing operation.

While certain prior art box manufacturing methods rely upon statistical analysis of a representative sampling of the overall number of produced boxes to make quality measurements, the present invention allows this measurement to be made on every box produced, thereby freeing the manufacturer from the imperfections of statistical analysis. In this way, the manufacturer is in a position to actually certify to the customer that the boxes have been properly made. Without this invention, such a certification could only be truly made by hand inspecting every single box, a laborious and expensive proposition.

Based upon the data of the video inspection system, the operator can optimize the machine parameters both during a box production run and for the next run. Moreover, he can determine whether the folding machinery has been properly designed.

As shown in FIG. 2, an appropriate light source, such as a strobe light 46, and video device 47 may also be installed above the passing boxes at a position relative to stacking station 38 so that an electronic image of the desired lateral edge of the passing box may be obtained. In this regard, it should be noted that, although reference is made herein to analysis of the trailing edge of the box blank, the leading edge may also be used as an appropriate reference point. The computer analysis of the electronically digitized image of each blank 10 is the same as described above, and this allows the operator to determine whether the box has been squarely folded. Certification of the finished product is more accurate at this point in the box manufacturing process.

However, a further problem is encountered in regard to the analysis of the folded box being fed to the squaring stacker station 38 by a bottom feed device. In such an arrangement, the pressed blank 10 is added to the bottom of the stack of blanks held in squaring and stacking station 38 until a suitable number of blanks are collected at which time the complete stack of folded boxes is conveyed to a final storage location 40. Thus, an overhead video device can observe only the uppermost box blank in each of the stacks since the subsequently fed blanks in such stacks will all be hidden from view by the top box.

Figure 6:
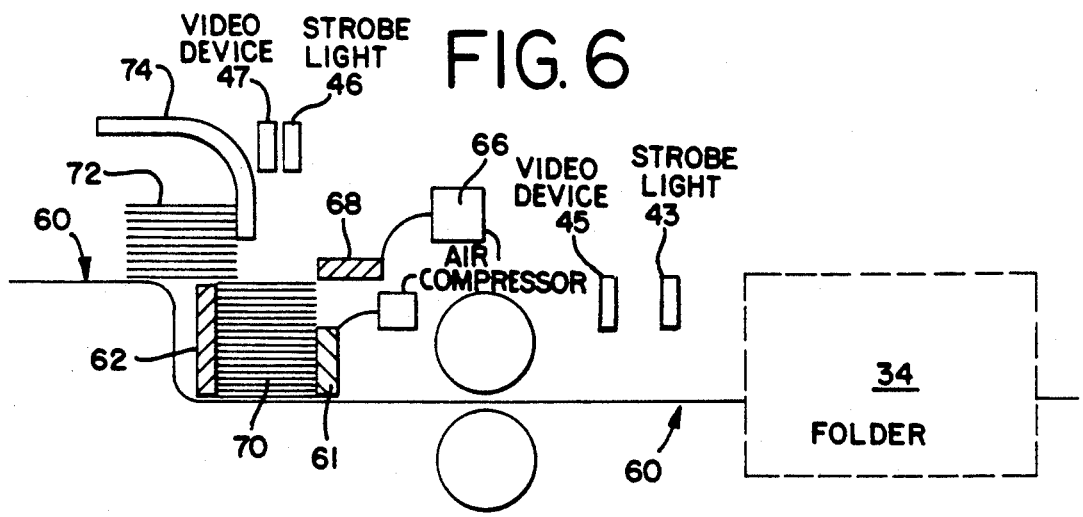
FIG. 6 is a schematic representation of a stacking portion of a box manufacturing apparatus.

The present invention, therefore provides a box "shuffler" arrangement 68, shown in FIG. 6. As conveyor belt 60 carries blank 10 beneath stack 38, the blank is urged against stationary front block 62 by a "spanker" 61, which reciprocates in the longitudinal direction of machine operation in order to square the stack 70 of box blanks 10. As each blank 10 ascends in the stack as a result of subsequent blanks being fed thereunder, it reaches a position or level suitable for an electronic image to be taken thereof by video device 47 which may operate in conjunction with a light source, such as strobe light 46, in a manner equivalent to vision device 45 referenced above. When the blank 10 reaches the proper position for the electronic image to be taken, a shuffler device 68 reciprocates longitudinally in the machine direction under the influence of compressed air, and is synchronized to remove the blank next preceding the blank 10 to be imaged from covering an edge portion of the blank 10 so that the necessary electronic image can be viewed by the equipment 47. After the image is taken, the shuffler 68 then urges the blank 10 into an essentially squared final stack 72 beneath preceding blanks, thus uncovering the necessary edge section of the next subsequent blank. Once a sufficient number of the blanks have been accumulated and the final stack 72 reaches a predetermined height, armature 74 moves the stack 72 forward onto a conveyor belt 60, where it is baled and shipped to the customer.

In this way the apparatus of the present invention allows a box manufacturer automatically to check the quality of the folded edges of corrugated boxes during the manufacturing process both before and after the squaring stage, and to certify the quality of all the boxes to a customer without the time consuming process of checking the boxes by hand, or the imperfect process of certifying quality based upon a statistical analysis of a random sampling of the produced boxes.

While particular embodiments of the invention have been shown and described, it should be understood that the invention is not limited thereto, since many modifications may be made. The invention is therefore contemplated to cover by the present application any and all such modifications which fall within the true spirit and scope of the basic underlying principles disclosed and claimed herein.

What is claimed is:

1. A method for monitoring the quality of boxes in-line as they are produced from blanks, comprising:
   (a) forming a folded box blank including four interconnected panels with a gap formed between two of said panels, each panel having a longitudinal edge and a lateral edge;
   (b) creating an electronic image of said blank, and digitizing the electronic image to provide digitized data;
   (c) processing the digitized data by computer to calculate critical parameters of the folded box blank; and
   (d) comparing the critical parameters with corresponding parameters stored in the computer to predict whether the folded box blank, when unfolded, will produce a square box having essentially all 90° angles between adjacent interconnected panels.

2. A quality monitoring method as recited in claim 1, wherein the critical parameters comprise width of the gap, longitudinal taper of the gap and alignment of the lateral edges of said two panels surrounding said gap.

3. A quality monitoring method as recited in claim 2, wherein the processing method for determining gap width comprises:
   (a) visually overlaying a reference line across the electronic image of the folded box blank generally parallel with the lateral edges of said two panels surrounding said gap, the reference line defining a first point on a first one of said panels and a second point on a second one of said panels; and
   (b) subtracting the distance between the first point and the longitudinal edge of the first panel, and the distance between the second point and the longitudinal edge of the second panel from the total distance between the first and second points.

4. A quality monitoring method as recited in claim 2, wherein the processing method for determining alignment comprises:
   (a) visually overlaying a reference line across the electronic image of the folded box blank generally parallel with the lateral edges of the two panels surrounding said gap and the edges of the interconnected panels, which are visible beneath said gap;
   (b) determining a first distance between the reference line and the lateral edge of a first one of said two panels;
   (c) determining a second distance between the reference line and the lateral edge of a second one of said two panels;
   (d) determining a third distance between the reference line and the lateral edge of said interconnected panels;
   (e) determining a first differential distance between the first distance and the third distance, and a second differential distance between the second distance and the third distance; and
   (f) comparing the first differential distance with the second differential distance.

5. A quality monitoring method as recited in claim 2, wherein the processing method for determining gap taper comprises:
   (a) visually overlaying a reference line across the electronic image of the folded box blank generally parallel with the lateral edges of the two panels surrounding said gap and the edges of the interconnected panels which are visible beneath said gap;
   (b) determining a first distance between the reference line and the lateral edge of a first one of said two panels;
   (c) determining a second distance between the reference line and the lateral edge of a second one of said two panels;
   (d) determining a third distance between the reference line and the lateral edge of said gap;
   (e) determining a first differential distance between the first distance and the third distance;
   (f) determining a second differential distance between the second distance and the third distance; and
   (g) calculating a taper angle of at least one of the longitudinal edges of the panels surrounding the gap relative to the longitudinal axis of the gap to determine longitudinal taper of the gap.

6. A quality monitoring method as recited in claim 5, wherein the taper angle of one of said longitudinal edges of one of said panels is calculated by determining the arctangent of a ratio of the differential distance of said one longitudinal edge and the width of said one panel.

7. A quality monitoring method as recited in claim 6, wherein the taper angles for each of the longitudinal edges surrounding the gap are combined to indicate the overall longitudinal taper of said edges.

8. A quality monitoring method as recited in claim 1, wherein the lateral edges of the two panels surrounding the gap comprise the trailing edges of the blank as it is being processed.

9. A quality monitoring method as recited in claim 1, wherein the determination whether the folded box blank will produce a square box having essentially all 90° angles between adjacent interconnected panels is employed to adjust the process parameters for producing the folded box blanks.

10. An inspection device for monitoring the quality of boxes in-line as they are produced from a folded blank having four interconnected panels with a gap formed between two of said panels, each panel having a longitudinal edge and a lateral edge, comprising:
   (a) means for creating an electronic image of the blank having said gap;
   (b) digitizing means for processing the electronic image of the blank to provide digitized data;
   (c) computer-assisted evaluation means for processing the digitized data to determine critical parameters of the blank; and
   (d) means for comparing the critical parameters with corresponding parameters stored in the computer to predict whether a folded blank, when unfolded, will produce a square box having essentially all 90° angles between adjacent interconnected panels.

11. A box inspection device as recited in claim 10, wherein the means for creating an electronic image comprises a video camera.

12. A box inspection device as recited in claim 11, further comprising a strobe light to visually stop movement of the blank as it is being processed so that the video camera can create said electronic image.

13. A box inspection device as recited in claim 10, wherein said computer calculates the critical parameters including the width of the gap, the longitudinal taper of the gap, and the alignment of the lateral edges of the two panels surrounding the gap.

14. An inspection device for monitoring the quality of boxes in-line as they are produced by a folding machine from a blank having four interconnected panels with a gap formed between two of said panels, each panel having a longitudinal edge, a lead lateral edge, and a trailing lateral edge, comprising:
   (a) means for squaring and stacking the blanks;
   (b) means for rendering each blank visually exposed to a first electronic imaging means for producing an electronic image of a portion of the blank having said gap;
   (c) digitizing means for processing the electronic image of the blank to provide digitized data;
   (d) computer-assisted evaluation means for processing the digitized data to determine critical parameters of the blank; and
   (e) means for comparing the critical parameters with corresponding parameters stored in the computer-assisted evaluation means to determine whether a folded blank, when unfolded, will produce a square box having essentially all 90° angles between adjacent interconnected panels.

15. A box inspection device as recited in claim 14, wherein said squaring and stacking means moves the blank beneath an accumulated stack of previously produced blanks.

16. A box inspection device as recited in claim 15, wherein said squaring and stacking means provides an accumulated stack of blanks having their lateral edges in vertically coextensive, planar alignment.

17. A box inspection device as recited in claim 16, wherein said squaring and stacking means includes a stationary block adjacent the lead lateral edges of the accumulated produced blanks and a longitudinally reciprocating paddle means which contacts the trailing lateral edges of the blanks causing the lead lateral edges thereof to abut said stationary block.

18. A box inspection device as recited in claim 17, wherein said paddle means comprises a flattened blade under the influence of compressed air.

19. A box inspection device as recited in claim 15, wherein said means for rendering each blank visually exposed to said electronic imaging means comprises longitudinally reciprocating shuffling means for engaging the trailing edge of the top-most blank of the accumulated stack in manner such that the blank is shifted to expose at least a portion of the next adjacent blank in the accumulated stack.

20. A box inspection device as recited in claim 19, wherein said shuffling means includes a paddle reciprocated longitudinally under &he influence of compressed air.

21. A box inspection device as recited in claim 14, wherein the means for creating an electronic image comprises a video camera.

22. A box inspection device as recited in claim 21, further comprising a strobe light to visually stop movement of the blank as it is being processed so that the video camera can create its photographic image of said blank.

23. A box inspection device as recited in claim 14, wherein a second electronic imaging means is provided, which is positioned upstream of said first electronic imaging means for preparing an electronic image of the folded blank having said gap.

24. A box inspection device as recited in claim 14, wherein said electronic imaging means, said stacking means, and said means for rendering each blank visually exposed to said electronic imaging means are synchronized in a manner such that each produced blank is stacked, visually exposed, and electronically imaged without interrupting the production of the folding machine.

25. A box inspection device as recited in claim 14, wherein said computer calculates the critical parameters, including the width of the gap, the longitudinal taper of the gap, and the alignment of the lateral edges of the two panels surrounding the gap.

* * * * *